US 6,748,915 B2

(12) United States Patent
Cole et al.

(10) Patent No.: US 6,748,915 B2
(45) Date of Patent: Jun. 15, 2004

(54) CLAMPLESS CONNECTION BETWEEN VEHICLE ENGINE THROTTLE BODY AND AIR RESONATOR

(75) Inventors: Roderic Cole, Chatham (CA); Mark Letourneau, Dover Centre (CA); Frances Warren, Chatham (CA)

(73) Assignee: Siemens VDO Automotive Inc., Chatham, CA (US)

( * ) Notice: Subject to any disclaimer, the term of this patent is extended or adjusted under 35 U.S.C. 154(b) by 0 days.

(21) Appl. No.: 10/256,280

(22) Filed: Sep. 26, 2002

(65) Prior Publication Data

US 2003/0070647 A1 Apr. 17, 2003

Related U.S. Application Data

(60) Provisional application No. 60/325,362, filed on Sep. 27, 2001, provisional application No. 60/325,363, filed on Sep. 27, 2001, and provisional application No. 60/325,371, filed on Sep. 27, 2001.

(51) Int. Cl.$^7$ ............................................. F02M 35/10
(52) U.S. Cl. ................... 123/184.53; 285/305
(58) Field of Search ...................... 123/184.53, 198 R, 123/184.57; 285/305

(56) References Cited

U.S. PATENT DOCUMENTS 6,298,816 B1 * 10/2001 Marentette ............. 123/184.57

\* cited by examiner

Primary Examiner—Tony M. Argenbright
Assistant Examiner—Katrina B. Harris

(57) ABSTRACT

A cuff is clamped to a boss on an air resonator. The cuff has an inner leg with an o-ring seal sized to provide a seal against an inner periphery of the air resonator boss. A throttle body has a boss to be received within the inner leg of the cuff, and will also deform the o-ring seal. The inner leg preferably includes a second forward seal which also contacts the throttle body boss. Preferably, this second seal includes a spring for biasing the second seal against the throttle body boss. The cuff is initially placed on the air resonator which may then be mounted within the engine compartment. The throttle body may be then simply snapped into the cuff. In this way, no space around the connection is necessary, while a dust-free connection is still provided.

12 Claims, 2 Drawing Sheets

US 6,748,915 B2

CLAMPLESS CONNECTION BETWEEN VEHICLE ENGINE THROTTLE BODY AND AIR RESONATOR

This application claims priority to U.S. Provisional Application Serial Nos. 60/325,362, 60/325,363 and 60/325,371, all filed on 27 Sep. 2001.

BACKGROUND OF THE INVENTION

This application relates to a clampless cuff which serves to connect an air resonator to a throttle body for a vehicle engine air supply system. In particular, the cuff is provided with an o-ring seal which contacts portions of both the throttle body and the air resonator.

Vehicle engines are provided with an air supply system that includes several components. To achieve maximum efficient and reliable operation of the engine, it is quite important that the air be as clean as possible. Thus, an air cleaner cleans air being delivered to the engine. From the air cleaner the air travels to an air resonator, which is essentially a large chamber (or chambers) which helps to control noise from the air supply. From the resonator the air typically passes through a throttle valve body. The throttle valve body includes a valve selectively opened and closed by a control to achieve a desired air flow volume to the engine. From the throttle body the air passes through an air manifold and eventually into the engine cylinders.

The throttle body is connected to the air resonator, and must have a connection that is essentially dust free. It would be detrimental to the supply of clean air to the engine to allow dust or other contaminants to be able to leak through the connection between the throttle body and the air resonator.

Typically, a tight clamp is utilized to clamp a cylindrical boss from the throttle to a cylindrical boss from the resonator. However, the use of the clamp requires access to the clamp during the vehicle assembly process, or during repair or replacement.

One desire of modern vehicle designers is to remove as many restrictions as possible for the placement and assembly of the various components in the vehicle. Thus, it would be desirable to allow the air resonator to be placed at a location such that it would not be easily accessible to a workman for tightening a clamp. As an example, to allow the tightening of a clamp, there must be sufficient space around the connection to provide access to the clamp. It would be desirable to eliminate the requirement of this space.

While connections other than clamps such as resilient cuffs, etc., may have been proposed in the past, they have not adequately provided a sufficiently tight dust seal.

SUMMARY OF THE INVENTION

In the disclosed embodiment of this invention, a resilient cuff is fixed between a boss on an air resonator and a boss on a throttle body. The cuff preferably has an o-ring bead with thinner portions on each side of the o-ring bead. The o-ring has an outer diameter selected to be greater than the inner diameter of one of the throttle body boss or air resonator boss. The other of the throttle body boss and air resonator bosses is smaller and will fit within the o-ring. The outer periphery of this other component is sized to be greater than the inner periphery of the o-ring seal. In this way, the o-ring is compressed to provide a seal on both bosses.

The present invention allows the throttle body to be simply snapped onto the resonator, with no need for access to the surrounding area. This thus provides greater flexibility to the vehicle designer in the positioning of the resonator.

Preferably, an axial seal is also provided on the outer of the throttle body and air resonator. In particular, a forward end of this outer component is snapped into a groove on the cuff. In this snapped position, the forwardmost end of the component abuts an inner surface of the cuff to provide an axial seal.

In one preferred embodiment, a forward seal is also provided against the inner member. This forward seal is most preferably provided with a spring such that the forward seal is biased radially inwardly against the inner member.

Other details of the specific construction of the cuff provide additional features. In the disclosed embodiment it is the air resonator which is positioned outwardly of the throttle body. Of course, in some assemblies the throttle body boss could be positioned outwardly of the air resonator boss.

In the preferred embodiment, the cuff is initially placed upon the air resonator boss, and the air resonator may then be mounted into the engine compartment. The cuff then receives a boss from the throttle body in a snap connection. The throttle body boss need merely be inserted into the inner leg of the cuff. Thus, no space around the outer periphery of the air resonator boss is necessary for tightening a clamp, etc. In this way, space restrictions on where the air resonator can be located are eliminated.

These and other features of the present invention can be best understood from the following specification and drawings, the following of which is a brief description.

DETAILED DESCRIPTION OF THE PREFERRED EMBODIMENT

Figure 1:
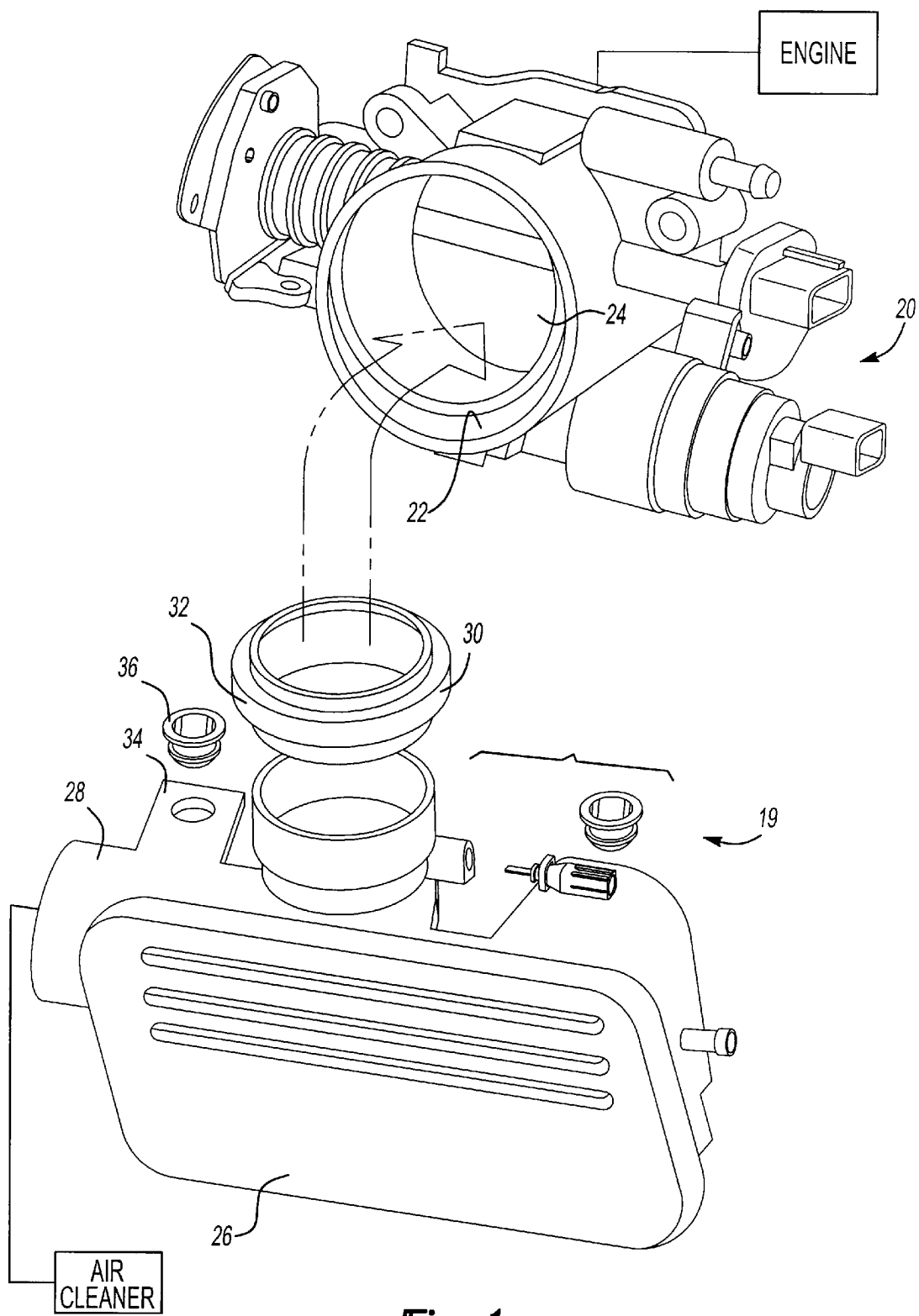
FIG. 1 is a schematic view of an air supply system for a vehicle engine.

FIG. 1 shows an air supply system 19 for a vehicle engine. As shown, a throttle body 20 incorporates a boss 22 providing a flow passage leading to a throttle valve 24. An engine is schematically shown downstream of the throttle body 20. Typically, an air manifold, would be intermediate the throttle body 20 and the engine.

An air resonator 26 is shown having a first air supply connection 28 leading to an air cleaner. A second connection is provided by a boss 30. A cuff 32 is illustrated intermediate the boss 22 and the boss 30. The cuff 32 serves to connect the two, as will be explained below.

Brackets 34 receive rivets 36, or some other type connection to secure the resonator within the engine compartment.

When the resonator is mounted within the engine compartment, the throttle body may then be brought to the resonator, with the cuff already mounted upon one of the two bosses. In this fashion, the throttle body can be simply snapped onto the air resonator 26, as will be better understood from a review of FIG. 2. Typically, the cuff 32 is initially mounted on the air resonator prior to its being mounted in the engine compartment.

Figure 2:
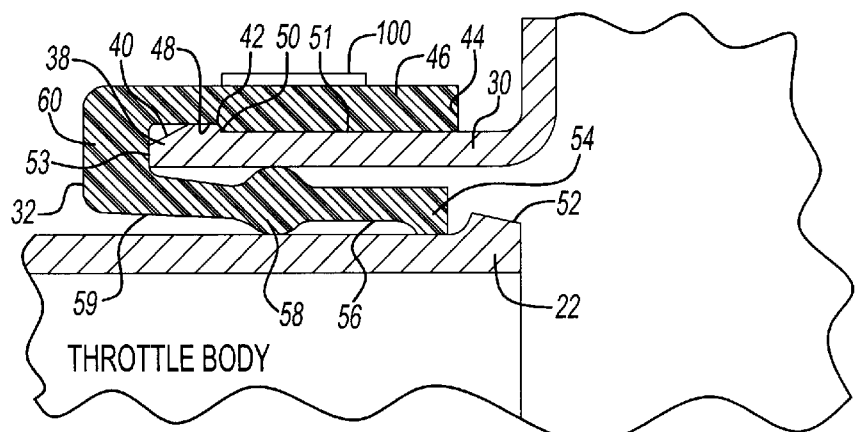
FIG. 2 is a cross-sectional view through the connection of a throttle body to an air resonator.

As shown in FIG. 2, the boss 30 is received within an outer leg 46 of the cuff 32. The boss 22 is received within an inner leg of the cuff 32. As shown, a forward end 46 of the cuff has a ramped surface 44. A similar ramped surface 40 on the forward end of the boss 30 will serve to facilitate the snapping of the boss 30 within the cuff 32. As further shown, a recess 48 is formed in the outer leg of the cuff 32, and has a ledge 50. A forward end 38 of the boss 30 is provided with a bead 42 which abuts the ledge 50. With the bead 42 received against the ledge 50, a forwardmost end 53 of the boss 30 also abuts an inner periphery of the end 60 of the cuff. Thus, there is a sealing contact between the end 53 and the cuff adjacent the inner periphery of the portion 60. Notably, there is also preferably a sealing contact along the interface 51 between the outer leg of the cuff 32 and the outer periphery of the boss 30. To this end, it is preferred that the inner periphery of the outer leg along with surface 51 has a slightly smaller diameter than the outer periphery of the boss 30 along this same portion. A clamp 100 is tightened to hold the leg 46 on the boss 30.

As also shown, an inner leg of the cuff has thinner portions 59 and 60 on each side of an o-ring 58. A forward end 54 of the cuff inner leg abuts an outer periphery of the throttle body boss 22. The o-ring 58 has an outer diameter which is chosen to be greater than the inner diameter of the boss 30. The o-ring 58 also has an inner diameter which is chosen to be less than the outer diameter than the throttle body boss 22. In this fashion, the o-ring 58 provides a seal against both the throttle body boss 22 and the air resonator boss 30. A forward end 52 of the throttle body boss 22 serves as a stop to hold the cuff 32 onto the throttle body.

Figure 3:
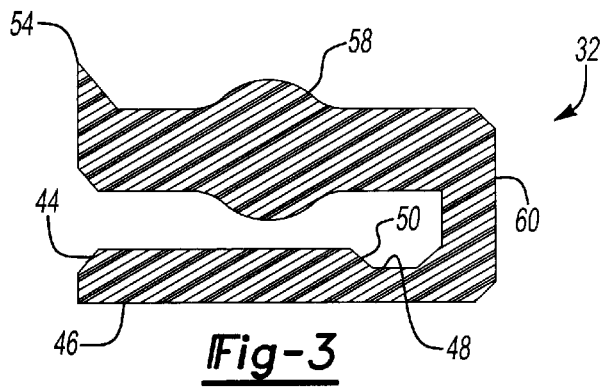
FIG. 3 is a cross-sectional view through one cuff embodiment.

As shown in FIG. 3, the cuff 32 includes the end 60, the recess 48, the ledge 50, the forward end 44, the bead 54 and the o-ring 58.

Preferably, the cuff 32 is initially inserted onto the boss 30 and held by the clamp 100. This occurs outside the engine compartment, and no space around the connection is necessary once the resonator 26 is mounted within the engine. The throttle body boss 22 may then be simply snapped within the cuff 32.

Figure 4:
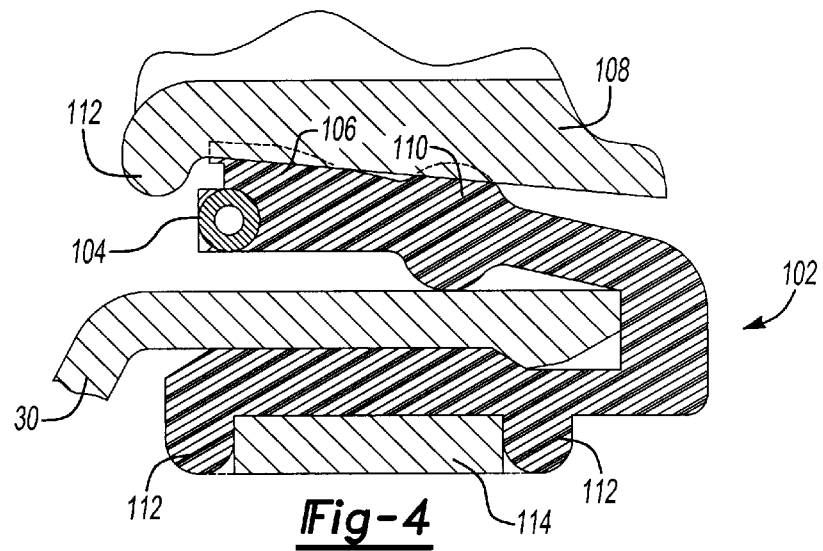
FIG. 4 is a cross-sectional view through a preferred embodiment.

A preferred embodiment cuff 102 is illustrated in FIG. 4. As shown, an outer leg is clamped to the air resonator in a fashion similar to the prior environment. Beads 112 serve to position the clamp 114 on the air resonator boss.

An end 106 of the cuff 102 provides the forward seal. A spring 104 provides a radially inward force such that the end 106 and its seal are deformed against the outer periphery of the throttle body 108. This deformed position is shown in dash line in FIG. 4. The o-ring 110 operates in a fashion similar to the above embodiment. As with the prior embodiment, the cuff 102 is preferably placed on the air resonator. The throttle body 108 may then be inserted within the inner leg, with a forward end 112 of the throttle body snapping past the seal 106, which is then deformed against the outer periphery of the throttle body boss 108.

The air resonator and throttle body can be generally as is known in the art with the exception of the modification to the shape of the boss as set forth above. The cuff is preferably formed of a rubber, and most preferably an EPDM rubber. One preferred rubber would have a durometer of 70.

Although a preferred embodiment of this invention has been disclosed, a worker of ordinary skill in the art would recognize that certain modifications would come within the scope of this invention. For that reason, the following claims should be studied to determine the true scope and content of this invention.

What is claimed is:

1. A vehicle air supply system comprising:

an air resonator having a first connection to receive a supply of clean air and a second connection including a boss;

a throttle body including a throttle valve, said throttle body having a boss to be connected to said air resonator boss; and a resilient cuff positioned between said air resonator boss and said throttle body boss, said resilient cuff having at least one leg with an enlarged seal with an outer diameter sealingly contacting an inner diameter of one of said bosses, and said enlarged seal having an inner diameter sealingly contacting said boss of the other of said throttle body and said air resonator, said resilient cuff being generally c-shaped, with an outer leg, an end portion and an inner leg, and said enlarged seal being formed on one of said inner and outer legs.

2. An air supply system as set forth in claim 1, wherein said enlarged seal being formed on said inner leg.

3. An air supply system as set forth in claim 2, wherein said enlarged seal is an o-ring seal.

4. An air supply system as set forth in claim 2, wherein a further seal bead is positioned at an extreme end of said inner leg, spaced from said enlarged seal, with thinner portions formed on said inner leg between said inner seal bead and said enlarged seal, and another thinner portion between said enlarged seal and said end portion.

5. An air supply system as set forth in claim 4, wherein said inner seal bead includes a spring providing a radially inwardly directing force for biasing said inner seal bead against said boss of said other of said throttle body and said air resonator.

6. An air supply system as set forth in claim 2, wherein said outer leg includes a ledge and a recess, said recess extending form said ledge to a position adjacent said end portion, with said one of said throttle body and said air resonator having an extreme end abutting an inner surface of said end portion, and a bead abutting said ledge to provide an axial seal.

7. An air supply system as set forth in claim 6, wherein said inner and of said one of said throttle body and said air resonator having a ramp, and an axially outermost portion of said outer leg having a meeting ramp to facilitate insertion of said cuff onto said boss.

8. An air supply system as set forth in claim 1, wherein said boss of said air resonator has a greater diameter than said boss of said throttle body.

9. An air resonator for a vehicle air supply system comprising:

an air resonator having a first connection to receive a supply of clean air and a second connection including a boss to be connected to a throttle valve body; and a resilient cuff positioned on said boss, said resilient cuff having at least one leg with an enlarged o-ring seal with an outer diameter sealingly contacting an inner diameter of said boss, and said enlarged seal having an inner diameter for sealingly contacting a boss of the throttle body, said cuff being generally c-shaped, with an outer leg radially outward of said boss, an end portion and an inner leg, and said enlarged seal being formed on said inner leg, a forward seal bead is positioned spaced toward said extreme end of said inner leg, spaced from said enlarged seal, with thinner portions formed on said inner leg between said inner seal bead and said enlarged seal, and another thinner portion between said enlarged seal and said end portion.

10. An air resonator as set forth in claim 9, wherein said outer leg includes a ledge and a recess, said recess extending form said ledge to a position adjacent said end portion, with said boss having an extreme end abutting an inner surface of said end portion, and a bead abutting said ledge to provide an axial seal.

11. An air resonator as set forth in claim 9, wherein said outer leg is clamped to said boss.

12. An air resonator as set forth in claim 9, wherein said forward seal bead including a spring member biasing said forward seal bead radially inwardly.

\* \* \* \* \*